April 6, 1965   P. MUCHNICK ET AL   3,177,402
OVER-CURRENT PROTECTIVE CIRCUITS
Filed May 25, 1962
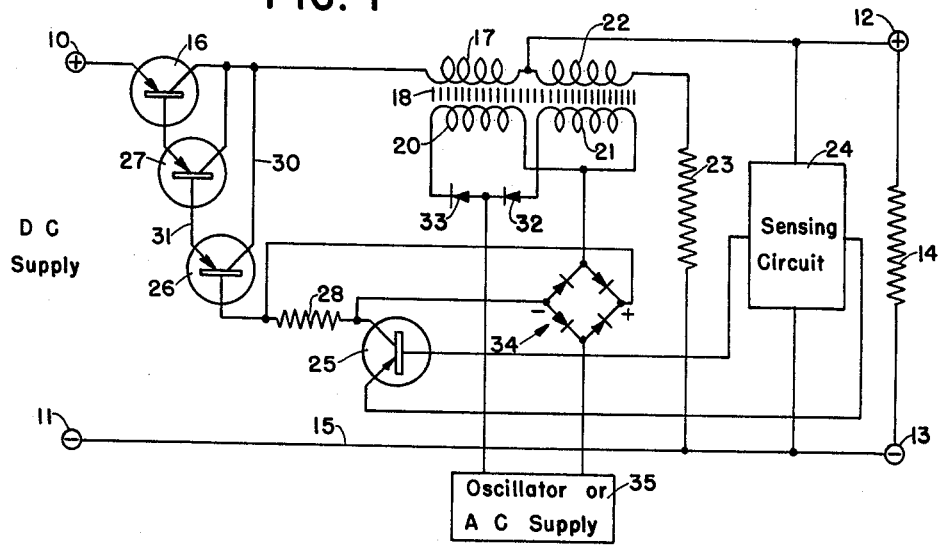
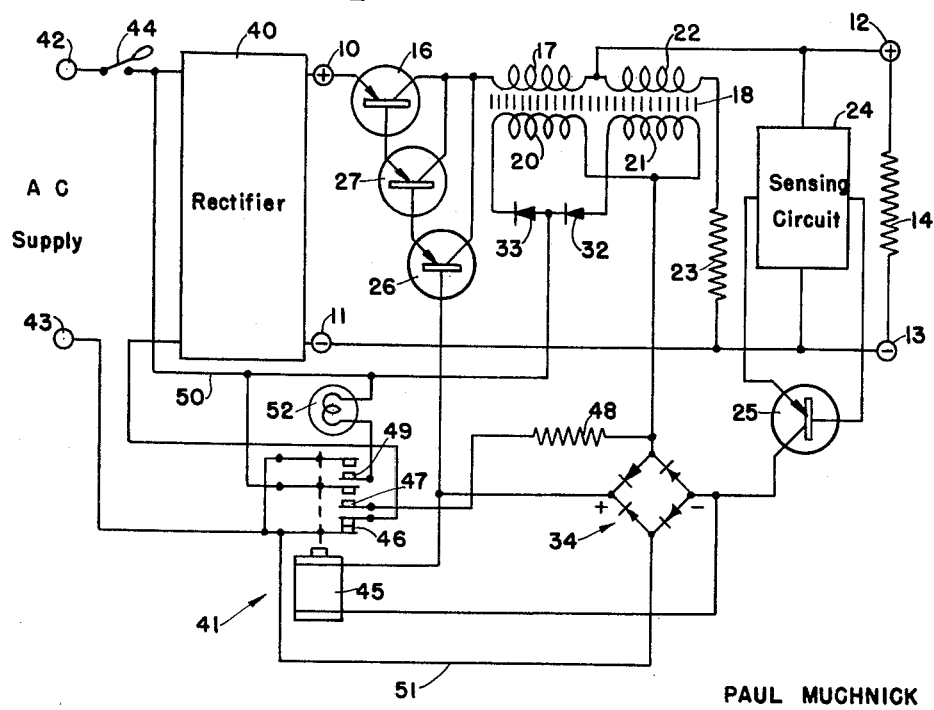
PAUL MUCHNICK
ERNEST LEVY, JR.
INVENTORS
BY *H. Murphy*
AGENT United States Patent Office 3,177,402
Patented Apr. 6, 1965

3,177,402
OVER-CURRENT PROTECTIVE CIRCUITS
Paul Muchnick, Norwalk, and Ernest Levy, Jr., Bloomfield, Conn., assignors to Raytheon Company, Lexington, Mass., a corporation of Delaware
Substituted for abandoned application Ser. No. 62,569, Oct. 14, 1960. This application May 25, 1962, Ser. No. 202,931
7 Claims. (Cl. 317—33)

This invention relates to a protective circuit for a voltage regulator which reduces the output voltage whenever an excessive current is sensed in the supply circuit. The invention has particular reference to the application of a variable alternating current impedance applied to a direct current regulator circuit.

The application of transistors and other solid state devices necessitates automatic protective circuits which are fast acting to protect the transistors from over-current effects. Prior devices employed fuses or circuit breakers, but these devices are too slow to protect transistors which can be destroyed by high currents before fuses or breakers open the circuit. The present invention employs a saturable reactor in a direct current regulator circuit for protecting a passing transistor from high current effects. The circuit can be used to disconnect the output circuit from the input circuit or it can be used to reduce the supply current to a very low value even when the output terminals are short-circuited. The protective circuit works in conjunction with the usual components of a direct current regulator which includes an output sensing circuit, an amplifier, and a passing impedance.

One of the objects of this invention is to provide an improved overcurrent protective circuit which avoids one or more of the disadvantages and limitations of prior art arrangements.

Another object of the invention is to provide a fast acting circuit component which protects solid state circuit components when a short-circuit is applied to the output terminals of a voltage regulator.

Another object of the invention is to protect voltage regulator circuits from excessive voltage applied from a source of supply.

Another object of the invention is to provide a protective circuit for direct current regulator circuits which does not interfere with the regulating portion of the circuit during normal operation.

Another object of the invention is to reduce the cost of protective circuits.

Another object of the invention is to cut off the current and voltage applied a pair of output terminals when excessive current is sensed. This switching action is resettable.

The invention includes the usual components of a direct current voltage regulator circuit and, in addition, a control winding is connected in series with one of the output terminals. This control winding is on a saturable core which under normal operating conditions is not saturated. The saturable core also contains two alternating current windings which are connected to a source of alternating current power in series with a rectifier circuit. The rectifier circuit is coupled to a resistor in the amplifier circuit and when a short-circuit is applied to the output terminals, the alternating current supply circuit creates a potential drop across the resistor which cuts off the passing transistor and reduces the output current to a very low value.

One feature of the invention includes the use of a relay winding in place of the resistor and then when a short-circuit occurs in the output, operating current is applied to the relay winding and the supply circuit is opened. Another pair of contacts is used to light a pilot lamp to indicate the operation of the protective circuit.

For a better understanding of the present invention, together with other and further objects thereof, reference is made to the following description taken in connection with the accompanying drawings.

FIG. 1 is a schematic diagram of connections showing one form of the circuit.

FIG. 2 is a schematic diagram of connections showing a relay connected to the circuit for opening the supply line and lighting a pilot lamp.

Referring now to FIG. 1, the circuit includes input terminals 10 and 11 which are to be connected to a direct current source of supply. A pair of output terminals 12 and 13 are to be connected to a load 14 which receives a regulated voltage. Input terminal 11 and output terminal 13 are connected together by a conductor 15 which may be grounded. A passing transistor 16 is connected in series with the positive line between terminals 10 and 12 and a control winding 17 is also connected in series with this circuit. Winding 17 is wound on a saturable core 18 which also has two alternating current coils 20 and 21. Winding 17 is for the detection of high currents which may result when the output terminals are short-circuited or when the load 14 is reduced to a very low value. A second control coil 22 is also wound on core 18 and connected between the output terminals in series with a resistor 23. Winding 22 is a bias winding to increase the sensitivity of the saturable reactor. High current in winding 17 causes core 18 to saturate and thereby reduce the impedance of windings 20 and 21.

The output terminals 12 and 13 are shunted by a sensing circuit 24 which determines an error of voltage, above or below a predetermined output voltage. The error voltage is applied to the base and emitter electrodes of a transistor 25 and the collector of this transistor is connected through amplifying transistors 26 and 27 to the passing transistor 16. The combination of the sensing circuit 24, the amplifier 25, 26, 27, and the passing transistor 16, is a direct current voltage regulator circuit which is well-known in the art and has been used for some time. The sensing circuit 24 may be a bridge circuit including a voltage reference component such as a Zener diode or it may be any other type of sensing circuit well-known in the art.

In order to control the amplifier circuit comprising the three transistors 25, 26, and 27, a resistor 28 is connected in series between the collector electrode of transistor 25 and the base electrode of transistor 26. This resistor may be connected in series with other parts of the amplifier circuit such as conductor 30 or conductor 31. However, the circuit shown in FIG. 1 is the most sensitive connection and is the preferred embodiment.

Windings 20 and 21 are connected in parallel with each other but each is connected in series with a rectifier 32 and 33 so that each winding passes current pulses of one polarity. Also connected in series with these two windings is a bridge rectifier 34 and an oscillator or alternating current supply 35. The opposite junction points of bridge 34 are connected directly across resistor 28.

The operation of this circuit is as follows: Under normal conditions when normal values of current and voltage are supplied to output terminals 12 and 13 the current through winding 17 is not sufficient to saturate the core 18 and for this reason the impedances of windings 20 and 21 are very high and very little current flows through these coils from the oscillator 35. For this reason the voltage applied to resistor 28 from the bridge circuit 34 is low and the amplifier circuit performs in the usual manner, amplifying the error voltage from the sensing circuit 24 and varying the resistance of passing transistor 16 to maintain a constant predetermined voltage across output terminals 12 and 13.

Now, if the load 14 is short-circuited, a very high current flows through winding 17, saturating the core 18, and lowering the impedance of windings 20 and 21 so that current can now flow from the oscillator 35 through the coils and through the bridge circuit 34 to produce an increase in voltage across resistor 28 and thereby block the operation of the amplifier and cut off conduction of transistor 16. As long as there are no switching components in the circuit, transistor 16 increases the resistance between its emitter and collector electrodes to a value which reduces the current through winding 17 to a much lower value but the current is not completely cut off. A balance is reached between the impedance of windings 20 and 21, the blocking potential across resistor 28, and the impedance of passing transistor 16. However, as long as the short-circuit remains across the output terminals, the output current will remain at its reduced value and no circuit components will be damaged.

The circuit shown in FIG. 2 contains all the components of the circuit shown in FIG. 1 with the addition of a rectifier 40, a relay 41, and input terminals 42 and 43 which are to be connected to an alternating current power supply. A switch 44 is connected in series with the terminal 42 and is necessary, as will be explained later, for resetting the relay. The relay 41 includes a winding 45, a pair of normally closed contacts 46, two pairs of normally open contacts 47, 49, and a resistor 48 in series with contacts 47. The relay winding 45 is designed so that it has the same resistance as resistor 28 shown in FIG. 1, and like resistor 28, it is connected to the direct current terminals of rectifier 34 and is also connected in series with the emitter electrode of transistor 25 and the base electrode of transistor 26.

The operation of the circuit shown in FIG. 2 is as follows: When switch 44 is closed, current is applied to the rectifier circuit 40 in series with the normally closed contacts 46 and direct current voltage is produced at terminals 10 and 11. Under normal conditions the circuit operates in the same manner as the regulator circuit shown in FIG. 1, the normal current passing through winding 45 being insufficient to cut off the passing transistor and also insufficient to operate the relay armature. When the output terminals 12, 13, are short-circuited and excessive current flows through winding 17, the voltage and current applied to the winding 45 is increased as described above, the resistance of the passing transistor 16 is greatly increased, and the relay 41 is operated to open contacts 46 and close contacts 47. When contacts 46 are open, current is cut off from the rectifier, the passing transistor, the windings 17 and 22, and the output terminals 12 and 13. However, when contacts 47 close a holding circuit is completed which may be traced from input terminal 42, through switch 44, over conductor 50, through contacts 47, through resistor 48, through the bridge rectifier 34, and back to the other input terminal 43 over conductor 51. This circuit provides rectified direct current for winding 45 and holds the relay in its operated condition as long as switch 44 remains closed. In order to unlock the relay circuit, switch 44 must be opened. The original condition of the circuit is then established and switch 44 may be closed to resume operation of the regular circuit. The closure of contacts 49 applies current to pilot lamp 52, lighting it, and indicating the operation of the protective circuit and the relay.

From the above description and drawings it will be evident that an over-current protective circuit has been described which can be used in connection with a voltage regulating circuit without interfering with its normal operation. The protective circuit operates only after a short-circuit or overload has occurred.

The foregoing disclosure and drawings are merely illustrative of the principles of this invention and are not to be interpreted in a limiting sense. The only limitations are to be determined from the scope of the appended claims.

We claim:

1. An over-current protective circuit for direct current voltage regulators comprising: a voltage regulator circuit which includes a passing impedance, a sensing circuit coupled to a load circuit, and an amplifier coupled between the sensing circuit and the passing impedance, said passing impedance connected in series between an input and an output terminal; a control winding connected in series between an input and an output terminal, said winding containing a saturable core which remains unsaturated during normal current flow; an alternating current winding also on said core and connected in series between a source of alternating current power and a rectifier; and coupling means between the direct terminals of said rectifier and the passing impedance for increasing the impedance value when a current greater than a predetermined value is sent through said control winding.

2. An over-current protective circuit for direct current voltage regulators comprising: a voltage regulator circuit which includes a passing impedance, a sensing circuit coupled to a load circuit for producing an error voltage, and an amplifier coupled between the sensing circuit and the passing impedance for amplifying the error voltage; said impedance connected in series between an input and an output terminal; a control winding connected in series between an input and an output terminal; said winding containing a saturable core which remains unsaturated during normal current flow; an alternating current winding also on said core and connected in series between a source of alternating current power and a rectifier; and coupling means between the direct current terminals of said rectifier and a portion of said amplifier for causing the amplifier to increase the impedance to a high value when a current greater than a predetermined value is sent through said control winding.

3. An over-current protective circuit as set forth in claim 2 wherein said passing impedance is a transistor.

4. An over-current protective circuit as set forth in claim 2 wherein said saturable core also contains a bias winding for varying the sensitivity of the protective circuit.

5. An over-current protective circuit as set forth in claim 4 wherein a relay winding is connected in series between said direct current terminals of the rectifier and the amplifier, said winding controlling a pair of contacts connected in series with an input terminal for cutting off all current to the load when said predetermined value of current is sensed.

6. An over-current protective circuit as set forth in claim 5 wherein a power rectifier circuit is connected between the input and output terminals and the input terminals are for connection to an alternating current source of power.

7. An apparatus for providing a load current comprising in combination, a voltage regulator circuit which includes a passing impedance, a sensing circuit coupled to a load circuit, and a device responsive to said load current for controlling the passing impedance only when an excessive current is sensed in said load circuit, said device comprising a saturable core reactor having a control winding coupled between said passing impedance and said load circuit and a plurality of series-coupled windings connected to a source of power, each of said plurality of windings simultaneously exhibiting a low value of impedance whenever the load current passing through said control winding exceeds a predetermined value.

References Cited by the Examiner
UNITED STATES PATENTS

| | | | |
|---|---|---|---|
| 2,697,813 | 12/54 | Stone | 323—79 |
| 2,892,155 | 6/59 | Radus | 323—89 X |
| 2,910,626 | 10/59 | Kros | 317—20 |
| 2,912,635 | 11/59 | Moore | 307—88.5 |
| 2,925,548 | 2/60 | Scherer | 317—51 |
| 2,963,637 | 12/60 | Osborn | 317—16 |
| 3,058,034 | 10/62 | Sandin | 317—148.5 |
| 3,076,925 | 2/63 | Jackson | 323—126 X |
| 3,098,192 | 7/63 | Levy et al. | 317—33 X |

SAMUEL BERNSTEIN, *Primary Examiner.*

LLOYD McCOLLUM, *Examiner.*